United States Patent
Cornibert et al.

(10) Patent No.: US 9,503,295 B2
(45) Date of Patent: Nov. 22, 2016

(54) METHOD AND APPARATUS FOR GENERATING A PROOF-MASS DRIVE SIGNAL

(71) Applicants: Laurent Cornibert, Toulouse (FR); Hugues Beaulaton, Toulouse (FR); Thierry Cassagnes, Tournefeuille (FR); Gerhard Trauth, Muret (FR)

(72) Inventors: Laurent Cornibert, Toulouse (FR); Hugues Beaulaton, Toulouse (FR); Thierry Cassagnes, Tournefeuille (FR); Gerhard Trauth, Muret (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/440,187

(22) PCT Filed: Nov. 6, 2012

(86) PCT No.: PCT/IB2012/002664
§ 371 (c)(1),
(2) Date: May 1, 2015

(87) PCT Pub. No.: WO2014/072762
PCT Pub. Date: May 15, 2014

(65) Prior Publication Data
US 2015/0280949 A1    Oct. 1, 2015

(51) Int. Cl.
*G06F 13/42*    (2006.01)
*H04L 27/04*    (2006.01)
*G01C 19/5726*    (2012.01)
*H04L 27/12*    (2006.01)

(52) U.S. Cl.
CPC ........... *H04L 27/04* (2013.01); *G01C 19/5726* (2013.01); *H04L 27/125* (2013.01)

(58) Field of Classification Search
CPC .. H04L 27/04; H04L 27/125; G01C 19/5726
USPC ......................................................... 340/1.1
See application file for complete search history.

(56) References Cited

U.S. PATENT DOCUMENTS 6,276,204 B1    8/2001    Townsend
6,718,823 B2    4/2004    Platt
(Continued)

OTHER PUBLICATIONS

M'Closkey R. T. et al: "Analysis of a Microsensor Automatic Gain Control Loop", American Control Conference, Proceedings of the 1999 San Diego, CA, USA, Jun. 2-4, 1999, Piscataway, NJ, USA, IEEE, vol. 5, Jun. 2, 1999, pp. 3307-3311.

(Continued)

*Primary Examiner* — Tanmay Shah
(74) *Attorney, Agent, or Firm* — Charlene R. Jacobsen

(57) ABSTRACT

A drive-mode oscillator module generates at least one proof-mass drive signal for use within a micro-electro-mechanical system (MEMS) device. The drive-mode oscillator module comprises at least one gain control component arranged to receive at least one proof-mass motion measurement signal, and to generate a digital modulation control signal based at least partly on the at least one proof-mass motion measurement signal, and at least one modulation component arranged to receive the digital amplitude modulation control signal, and to output at least one proof-mass drive signal. The at least one modulation component is arranged to digitally modulate the at least one proof-mass drive signal based at least partly on the received digital amplitude modulation control signal.

15 Claims, 5 Drawing Sheets

(56) References Cited

U.S. PATENT DOCUMENTS

| | | |
|---|---|---|
| 6,769,304 B2 | 8/2004 | Platt et al. |
| 2007/0052456 A1 | 3/2007 | Watson |
| 2010/0091134 A1* | 4/2010 | Cooke ................ H04N 5/23245 |
| | | 348/229.1 |
| 2010/0102895 A1* | 4/2010 | Beukema ............ H04L 27/0008 |
| | | 332/103 |
| 2011/0179868 A1* | 7/2011 | Kaino ................ G01C 19/5607 |
| | | 73/504.12 |
| 2012/0191398 A1 | 7/2012 | Murakami et al. |
| 2014/0097910 A1* | 4/2014 | Breslin ................ H03B 5/1231 |
| | | 331/114 |
| 2014/0260614 A1* | 9/2014 | Bhave ................ G01C 19/5677 |
| | | 73/514.26 |

OTHER PUBLICATIONS

International Search Report and Written Opinion correlating to PCT/IB2012/002664 dated Nov. 11, 2013.

* cited by examiner

METHOD AND APPARATUS FOR GENERATING A PROOF-MASS DRIVE SIGNAL

FIELD OF THE INVENTION

This invention relates to a method and apparatus for generating a proof-mass drive signal, and in particular to a drive-mode oscillator module for generating at least one proof-mass drive signal for use within a micro-electro-mechanical system (MEMS) device and method therefor.

BACKGROUND OF THE INVENTION

A gyroscope is a sensor that measures the rate of rotation of an object. The concept of a vibrating MEMS (Micro-Electro-Mechanical System) gyroscope is to generate momentum of a proof-mass to induce and detect the Coriolis force. A Coriolis force is applied to the proof-mass in motion when an angular rate is applied. The Coriolis force Fc is the product of the proof-mass m, the input rate Ω and the mass velocity v. The direction of the Coriolis force is perpendicular to the motion of the proof-mass.

The basic architecture of a vibratory gyroscope is comprised of a drive-mode oscillator circuit that generates and maintains a constant linear momentum of the proof-mass, and a sense mode circuit that measures the sinusoidal Coriolis force induced due to the combination of the drive oscillation and any angular rate input. The majority of vibratory gyroscopes utilize a vibratory proof-mass suspended by springs above a substrate. The objective being to form a vibratory drive oscillator coupled to an orthogonal sense system detecting the Coriolis force.

Since the Coriolis Effect is based on conservation of momentum, the drive-mode oscillator circuit is implemented to provoke the oscillation of the proof-mass which is the source of this momentum.

FIG. 1 illustrates a simplified block diagram of an example of a MEMS gyroscope implementation 100. In such a MEMS gyroscope implementation 100, a drive-mode oscillator circuit 110 vibrates the proof-mass 120, causing the proof-mass 120 to oscillate. When an angular rate is applied to the proof-mass 120, the motion of the proof-mass 120 is deflected in a direction perpendicular to the direction of oscillation of the proof-mass (sense mode). The amount of deflection may then be measured via sense electrodes and used to determine the angular rate that was applied to the proof-mass.

Due to the mechanical properties of such MEMS devices, the drive-mode oscillation circuit 110 is required to operate at a resonance frequency of the proof-mass 120. In a typical MEMS gyroscope implementation, the drive-mode oscillator circuit 110 is based on a self-oscillating loop principle in which the proof-mass motion is detected, phase-shifted, amplified and used as an electrical stimulus to drive the proof-mass oscillation.

FIG. 2 illustrates a simplified block diagram of an example of such a conventional drive-mode oscillator circuit 110. The drive-mode oscillator circuit 110 in the illustrated example comprises a capacitance to voltage (C2V) circuit 210 arranged to convert a capacitance change of differential MEMS drive measurement units (DMUs) 200, 205 caused by the displacement of the proof-mass to a differential voltage measurement signal 215. An integrator 220 receives the voltage measurement signal and phase shifts it by, for example, 90° to compensate for the phase lag of the system. A voltage gain amplifier (VGA) 230 receives the phase shifted voltage signal 225 and outputs a proof-mass drive signal 235 to differential drive actuation units (DAUs) 240, 245, which vibrate the proof-mass 120 accordingly. An automatic gain control (AGC) circuit 250 provides a control signal 255 to the VGA 230 to control the amplitude of the proof-mass drive signal 235 output thereby. Conventionally, such an AGC circuit 250 is implemented using complex analogue circuitry for providing the necessary gain correction, which tends to require high current consumption and a large die-size, and is prone to temperature and process variations.

SUMMARY OF THE INVENTION

The present invention provides a drive-mode oscillator module for generating at least one proof-mass drive signal for use within a micro-electro-mechanical system (MEMS) device, a micro-electro-mechanical system (MEMS) device comprising at least one such drive-mode oscillator module, and a method of generating at least one proof-mass drive signal for use within a micro-electro-mechanical system (MEMS) device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to examples of a method and apparatus for generating a proof-mass drive signal for use within a micro-electro-mechanical system (MEMS) device. It will be appreciated that the present invention is not limited to the specific examples herein described and illustrated in the accompanying drawings. For example, the present invention is herein described with reference to a drive-mode oscillator module comprising a differential architecture and arranged to receive and output differential signals. However, the present invention may equally be implemented within a single-ended architecture whereby a drive-mode oscillator module receives and outputs single-ended signals.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
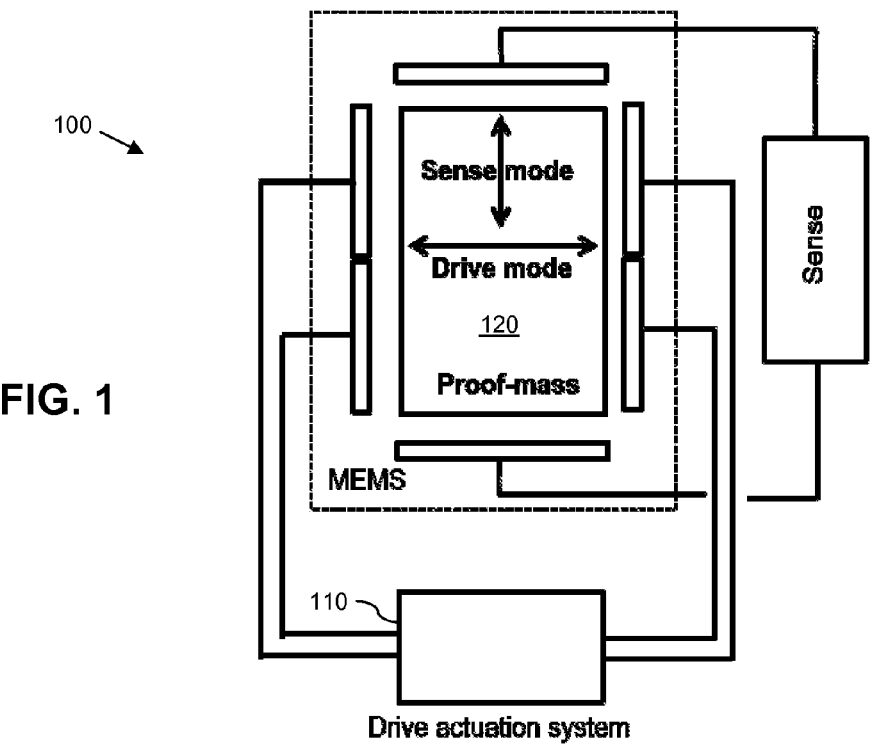
FIG. 1 illustrates a simplified block diagram of an example of a micro-electro-mechanical system (MEMS) gyroscope implementation.
Figure 2:
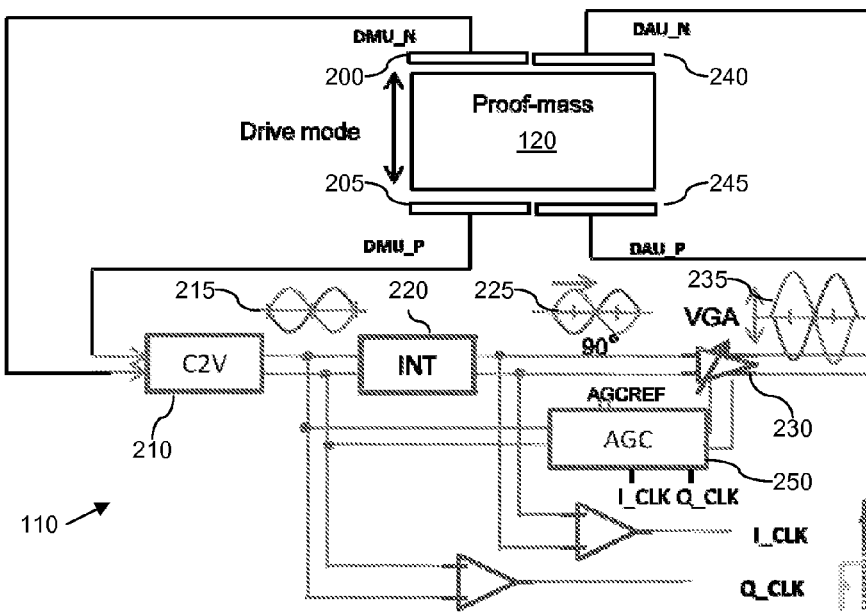
FIG. 2 illustrates a simplified block diagram of an example of a conventional drive-mode oscillator circuit.
Figure 3:
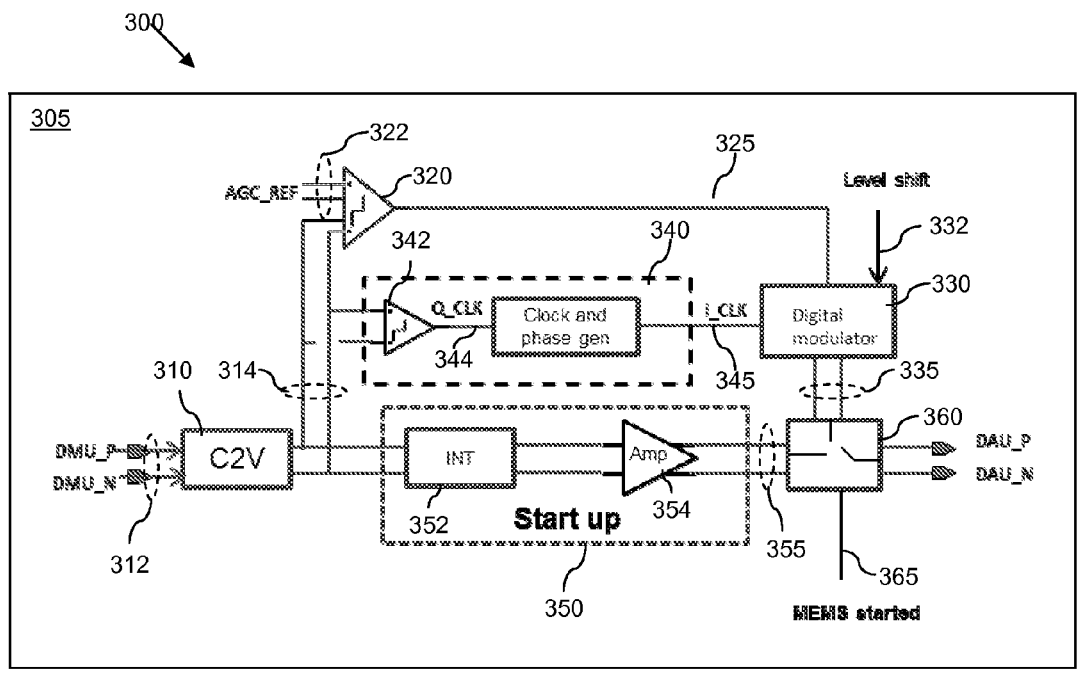
FIG. 3 illustrates a simplified block diagram of an example of a drive-mode oscillator module.

Referring first to FIG. 3, there is illustrated a simplified block diagram of an example of a drive-mode oscillator module 300 for generating a proof-mass drive signal for use within a micro-electro-mechanical system (MEMS) device, such as the MEMS gyroscope device 100 illustrated in FIG. 1. The drive-mode oscillator module 300 may be implemented within an integrated circuit device, for example as illustrated generally at 305, comprising at least one die within a single integrated circuit package.

The drive-mode oscillator circuit 300 in the illustrated example comprises a capacitance to voltage (C2V) circuit 310 arranged to convert a capacitance change measurement signal 312 received from differential MEMS drive measurement units (DMUs) (not shown) into a proof-mass motion measurement voltage signal 314.

The drive-mode oscillator module 300 further comprises a gain control component 320, which in the illustrated example comprises a comparator. The gain control component 320 is arranged to receive the converted proof-mass motion measurement signal 314, and to generate a digital modulation control signal 325 based at least partly on the proof-mass motion measurement signal 314. For example, and as illustrated in FIG. 3, the gain control component 320 may be arranged to receive a reference amplitude signal 322, compare the proof-mass motion measurement signal 314 to the reference amplitude signal 322, and output the digital modulation control signal 325 comprising an indication of whether the amplitude of the proof-mass motion measurement signal 314 exceeds a voltage level of the reference amplitude signal 322. In the example differential implementation illustrated in FIG. 3, the differential amplitude of the proof-mass motion measurement signal 314 is compared with an absolute value between differential components of the reference amplitude signals 322 (AGC_REFp-AGC_REFn), and an indication of whether the differential amplitude of the proof-mass motion measurement signal 314 exceeds the absolute value between differential components of the reference amplitude signals 322 is output as the digital modulation control signal 325.

The drive-mode oscillator module 300 further comprises a modulation component 330 arranged to receive the digital amplitude modulation control signal 325 output by the gain control component 320, and to output a proof-mass drive signal 335. The proof-mass drive signal 335 may then be provided to differential drive actuation units (DAUs) (not shown), which vibrate a proof-mass of the MEMS device accordingly, such as the proof-mass 120 of the MEMS gyroscope device 100 illustrated in FIG. 1. The modulation component 330 is further arranged to digitally modulate the proof-mass drive signal 335 based at least partly on the received digital amplitude modulation control signal 325, as described in greater detail below with reference to FIGS. 4 to 9.

The drive-mode oscillator module 300 illustrated in FIG. 3 further comprises a phase component 340 arranged to receive the proof-mass motion measurement signal 314 output by the C2V circuit 310, detect a proof-mass motion phase, and output to the modulation component 330 a digital phase signal 345. The modulation component 330 may thus be arranged to output the proof-mass drive signal 335 comprising a phase based at least partly on the received digital phase signal 345 output by the phase component 340.

In the illustrated example, the phase component 340 comprises a comparator 342 arranged to receive the differential proof-mass motion measurement signal 314, compare a first differential component of the differential proof-mass motion measurement signal 314 to a second differential component of the differential proof-mass motion measurement signal 314, and output a phase detection signal 344 based on the comparison of the first and second differential components of the differential proof-mass motion measurement signal 314. The phase component 340 illustrated in FIG. 3 further comprises a phase shift component 346 arranged to receive the phase detection signal 344 output by the comparator 342, apply a 90° phase shift to the phase detection signal 344, and output the digital phase signal 345 comprising the phase shifted phase detection signal.

Figure 4:
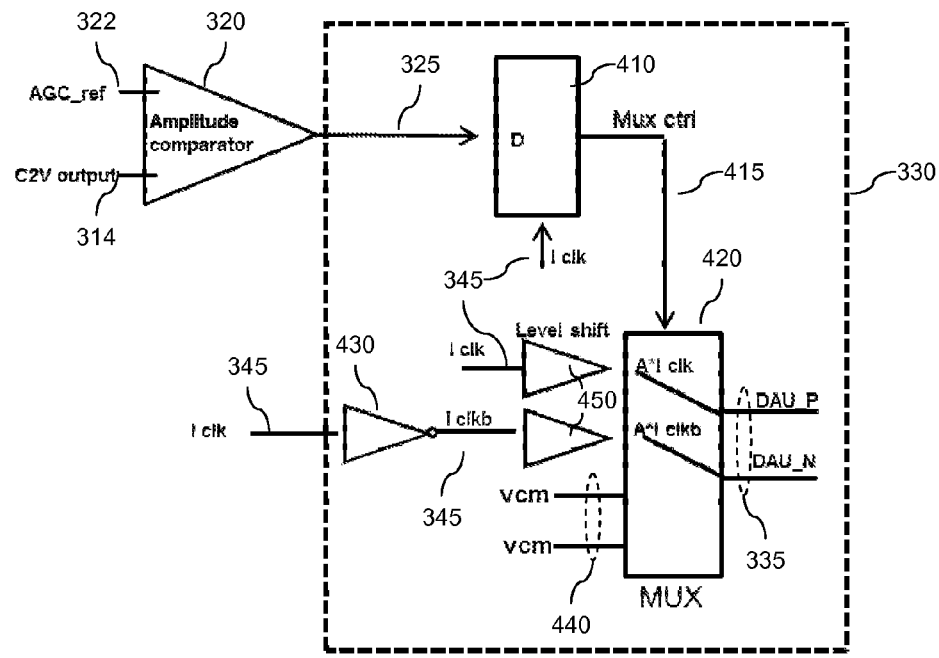
FIG. 4 illustrates a simplified block diagram of an example of a modulation component of the drive-mode oscillator module of FIG. 3.

Referring now to FIG. 4, there is illustrated a simplified block diagram of a first example of the modulation component 330. In the example illustrated in FIG. 4, the modulation component 330 is arranged to apply amplitude shift keying (ASK) modulation to the proof-mass drive signal 335. The modulation component 330 comprises, in the illustrated example, a flip-flop 410 arranged to receive at a data input thereof the digital amplitude modulation control signal 325 output by the gain control component 320. The flip-flop 410 is further arranged to receive at a clock input thereof the digital phase signal 345 output by the phase component 340. In this manner, the flip-flop 410 is arranged to capture and hold the digital amplitude modulation control signal 325 upon each rising edge of the digital phase signal 345 (e.g. at the start of each cycle thereof). The flip-flop 410 is further arranged to output a modulation selection signal 415 comprising the captured and held digital amplitude modulation control signal 325.

It will be appreciated that the flip-flop 410 is one possible implementation for capturing and holding the digital amplitude modulation control signal 325. For example, it is also possible to perform a capture and hold on both rising and falling edges of the digital phase signal 345 using, say, two flip-flops working in parallel, or an equivalent solution. In this manner, the refresh of the modulation selection signal 415 may be performed at twice the clock frequency.

The modulation component 330 further comprises a multiplexer component 420 arranged to receive at a control input thereof the modulation selection signal 415. The multiplexer component 420 comprises a first (differential) input arranged to receive the digital phase signal 345, and a second (differential) input arranged to receive, in the example illustrated in FIG. 4, a constant voltage signal 440. In the illustrated example, an inverter 430 is used to provide an inverted version of the digital phase signal 345; in this manner a differential form of the digital phase signal 345 to be provided to the first input of the multiplexer component 420 is created, with a first differential component comprising the original digital phase signal 345 and a second differential component comprising the inverted version of the digital phase signal 345. The multiplexer component 420 is arranged to selectively output, as the proof-mass drive signal 335, one of the (differential) digital phase signal 345 and the constant voltage signal 440.

Figure 5:
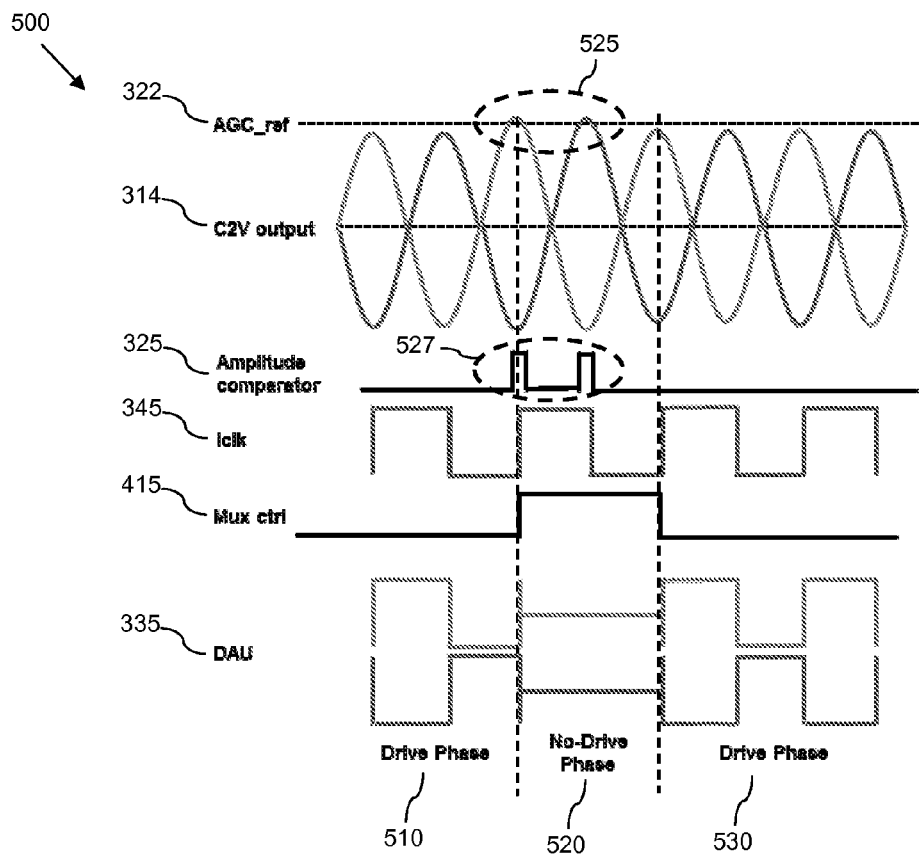
FIG. 5 illustrates an example of a simplified timing diagram for the modulation component of FIG. 4.

FIG. 5 illustrates a simplified timing diagram 500 of an example of the modulation component 330 of FIG. 4 digitally modulating the proof-mass drive signal 335 based on the received digital amplitude modulation control signal 325 and digital phase signal 345. The differential proof-mass motion measurement voltage signal 314 is illustrated with reference to the reference amplitude signal 322. As can be seen in FIG. 5, the digital phase signal 345 comprises a 90° shifted representation of the phase of the proof-mass motion measurement voltage signal 314.

In an initial drive phase 510 of the digital modulation illustrated in FIG. 5, the proof-mass motion measurement voltage signal 314 comprises an amplitude less than the reference amplitude signal 322. As a result, the digital amplitude modulation control signal 325 output by the gain control component 320 comprises, in the illustrated example, a low logical level. Accordingly, the modulation selection signal 415 output by the flip-flop 410 also comprises a low logical level. In the example illustrated in FIG. 4, the multiplexer component 420 is arranged to selectively output the signal received at its first input upon receipt of a low logical signal at its control input. Thus, in the initial drive phase 510 illustrated in FIG. 5, the multiplexer component 420 outputs, as the proof-mass drive signal 335, the differential form of the digital phase signal 345, outputting a 90° phase shifted oscillating proof-mass drive signal when the proof-mass motion measurement signal 314 is less than the reference amplitude signal 322.

Such a 90° phase shifted oscillating proof-mass drive signal will have the effect of accelerating the oscillations of the proof-mass, causing a gradual increase in the magnitude of the proof-mass oscillations. In this manner, as the oscillations of the proof-mass gradually increase in magnitude, the amplitude of the proof-mass motion measurement voltage signal 314 will gradually increase. When an amplitude of the proof-mass motion measurement voltage signal 314 subsequently exceeds the reference amplitude signal 322, as illustrated at 525, the gain control component 320 detects as such and outputs high logical level pulses within the digital amplitude modulation control signal 325 corresponding to instances when the amplitude of the proof-mass motion measurement voltage signal 314 exceeds the reference amplitude signal 322, as indicated at 527. As can be seen in FIG. 5, because of the 90° phase shift in the digital phase signal 345 relative to the phase of the proof-mass motion measurement voltage signal 314, the high logical level pulses occur on each of a rising and falling edge of the digital phase signal 345. Accordingly, and as described above in relation to FIG. 4, the flip-flop 410 captures and holds the high logical level of the digital amplitude modulation control signal 325 that occurs during, in the illustrated example, the rising edge of the digital phase signal 345. As a result, the modulation selection signal 415 changes from a low logical level to a high logical level, causing the multiplexer component 420 to selectively switch to outputting, as the proof-mass drive signal 335, the signal received at its second input; i.e. the constant voltage signal 440 in the example illustrated in FIGS. 4 and 5. As a consequence, the digital modulation illustrated in FIG. 5 changes into a second, no-drive phase 520 in which the proof-mass drive signal 335 output by the modulation component 300 comprises a constant voltage.

As will be appreciated, such a constant voltage drive signal will have the effect of stopping the oscillating driving force being applied to the proof-mass, which will subsequently continue to vibrate as a result of momentum, but at a gradually reducing magnitude. Accordingly, during such a no-drive phase 520, the amplitude of the proof-mass motion measurement voltage signal 314 will gradually decrease as the magnitude of the proof-mass oscillations decreases, resulting in the proof-mass motion measurement voltage signal 314 falling below the reference amplitude signal 322. Upon the proof-mass motion measurement voltage signal 314 falling below the reference amplitude signal 322, the gain control component 320 ceases detecting the proof-mass motion measurement voltage signal 314 exceeding the reference amplitude signal 322, and thus ceases outputting high logical level pulses within the digital amplitude modulation control signal 325. As a result, the digital amplitude modulation control signal subsequently comprises a substantially continuous low logical level. Thus, upon the next rising edge of the digital phase signal 345, the flip-flop 410 captures and holds the low logical level of the digital amplitude modulation control signal 325, causing the modulation selection signal 415 to change from a high logical level to a low logical level. As a result, the multiplexer component 420 selectively reverts back to outputting the differential form of the digital phase signal 345. As a consequence, the digital modulation illustrated in FIG. 5 reverts back to a drive phase 530 in which the proof-mass drive signal 335 output by the modulation component comprises, in the illustrated example, the differential form of the digital phase signal 345.

In the simplified example illustrated in FIG. 5, the no-drive phase has been illustrated as comprising a single oscillation cycle of the proof-mass motion measurement voltage signal 314. However, it will be appreciated that more than one cycle may occur before the amplitude of the proof-mass motion measurement voltage signal 314 falls below the reference amplitude signal 322.

This technique of digitally modulating the proof-mass drive signal 335 introduces a ripple caused by the 'switching' between drive phase and no-drive phase. Such a ripple may be minimised by configuring the 'strength' of the proof-mass drive signal 335 to minimise the rate at which the magnitude of the proof-mass oscillations increases during each drive phase. In the example illustrated in FIG. 4, each component of the differential form of the digital phase signal 345 is passed through a level shifter 450. Each level shifter 450 may be arranged to receive the respective component of the differential form of the digital phase signal 345, apply a voltage level shift thereto, and output the respective component of the differential form of the digital phase signal 345 at a voltage level configured to reduce the rate at which the magnitude of the proof-mass oscillations increase, and thus to reduce the ripple introduced by the digital modulation.

In some examples, the level shifters 450 may be configurable, for example by way of a level shift signal 332 (FIG. 3), to apply a configurable voltage level shift to the respective component of the differential form of the digital phase signal 345. In this manner, the voltage level at which the level shifters 450 output their respective component of the differential form of the digital phase signal 345 may configured as required. For example, the level shifters 450 may be configured to compensate for variations in temperature and/or process. Additionally/alternatively, the level shifters 450 may be configured to allow the drive-mode oscillator module 300 to be used with different MEMS devices having different drive signal requirements.

Figure 6:
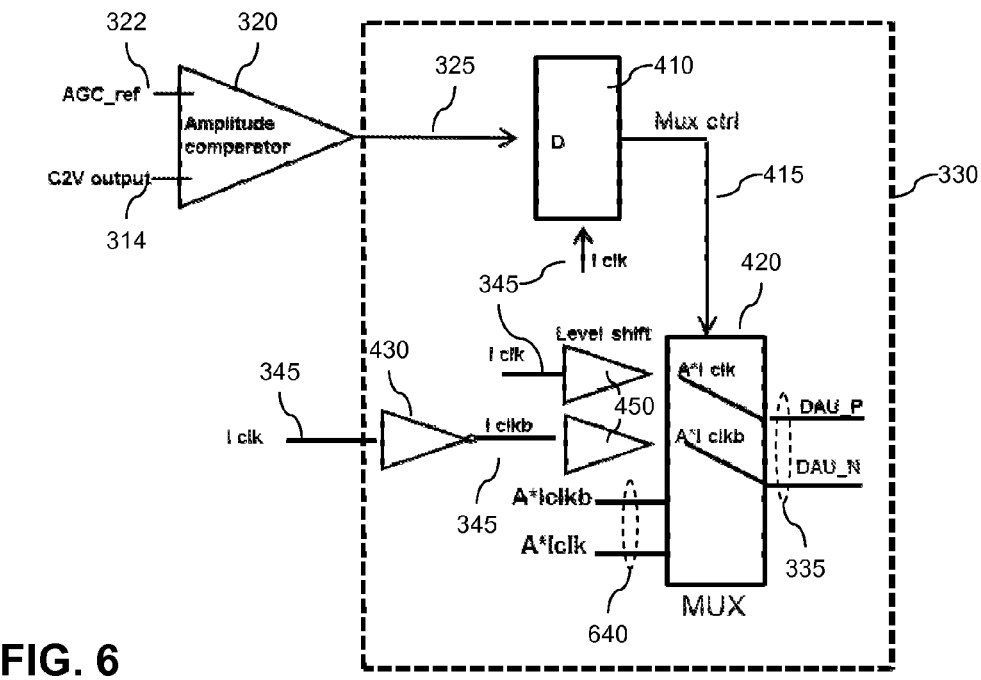
FIG. 6 illustrates a simplified block diagram of an alternative example of a modulation component of the drive-mode oscillator module of FIG. 3.

Referring now to FIG. 6, there is illustrated a simplified block diagram of a further example of the modulation component 330. In the example illustrated in FIG. 6, the modulation component 330 is arranged to apply binary phase shift keying (BPSK) modulation to the proof-mass drive signal 335. As for the example illustrated in FIG. 4, the multiplexer component 420 in FIG. 6 is arranged to receive at its first input the (level shifted) differential form of the digital phase signal 345. However, in the example illustrated in FIG. 6, the multiplexer component 420 is arranged to receive at its second input the inverse 640 of the differential form of the digital phase signal 345, instead of the constant voltage signal 440 in FIG. 4. In this manner, the multiplexer component 420 is arranged to selectively output, as the proof-mass drive signal 335, one of the digital phase signal 345 and the inverse 640 of the digital phase signal 345.

Figure 7:
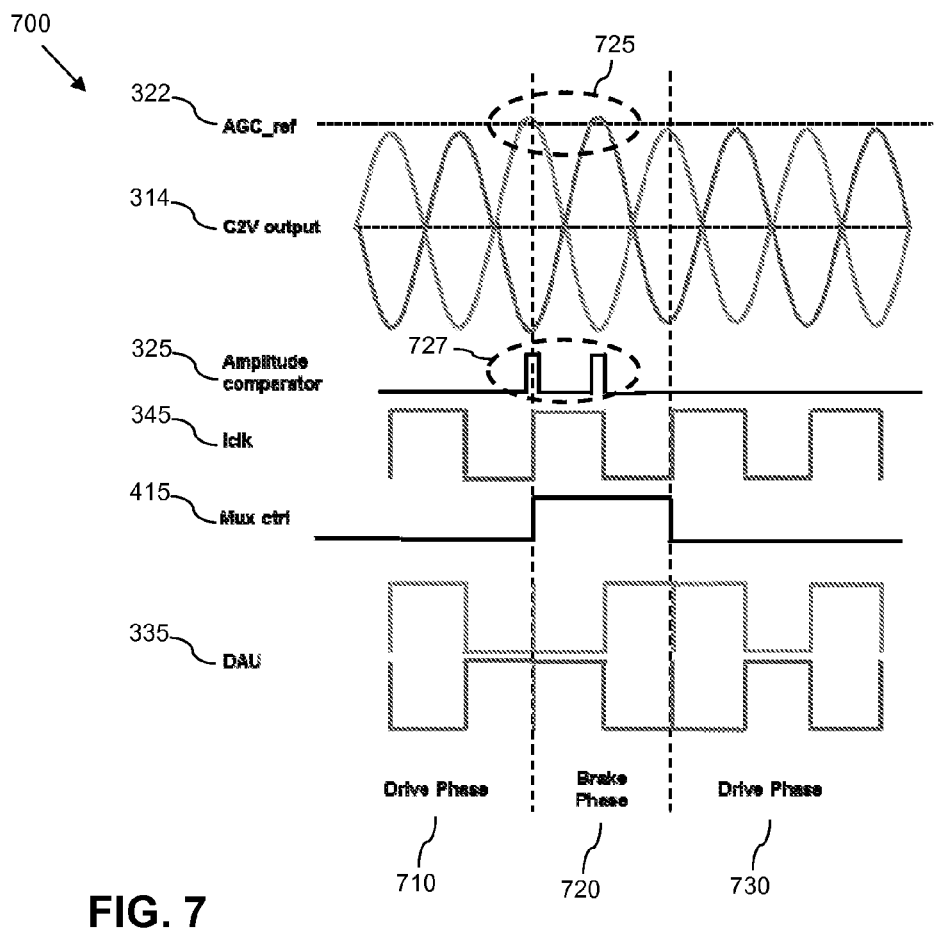
FIG. 7 illustrates an example of a simplified timing diagram for the modulation component of FIG. 6.

FIG. 7 illustrates a simplified timing diagram 700 of an example of the modulation component 330 of FIG. 6, modulating the proof-mass drive signal 335 based on the received digital amplitude modulation control signal 325 and digital phase signal 345. In the example illustrated in FIG. 7, in an initial drive phase 710, the proof-mass motion measurement voltage signal 314 comprises an amplitude less than the reference amplitude signal 322. As a result, the digital amplitude modulation control signal 325 output by the gain control component 320 comprises, in the illustrated example, a low logical level. Accordingly, the modulation selection signal 415 output by the flip-flop 410 also comprises a low logical level. In the example illustrated in FIG. 6, the multiplexer component 420 is arranged to selectively output the signal received at its first input upon receipt of a low logical signal at its control input. Thus, in the initial drive phase 710 illustrated in FIG. 7, the multiplexer component 420 outputs, as the proof-mass drive signal 335, the differential form of the digital phase signal 345, outputting a 90° phase shifted oscillating proof-mass drive signal when the proof-mass motion measurement signal 314 is less than the reference amplitude signal 322.

As mentioned in relation to FIG. 4, such a 90° phase shifted proof-mass drive signal will have the effect of accelerating the oscillations of the proof-mass, causing a gradual increase in the magnitude of the proof-mass oscillations. In this manner, as the oscillations of the proof-mass gradually increase in magnitude, the amplitude of the proof-mass motion measurement voltage signal 314 will gradually increase. When an amplitude of the proof-mass motion measurement voltage signal 314 subsequently exceeds the reference amplitude signal 322, as illustrated at 725, the gain control component 320 detects as such and outputs high logical level pulses within the digital amplitude modulation control signal 325 corresponding to instances when the amplitude of the proof-mass motion measurement voltage signal 314 exceeds the reference amplitude signal 322, as indicated at 727. The flip-flop 410 captures and holds the high logical level of the digital amplitude modulation control signal 325 that occurs during, in the illustrated example, the rising edge of the digital phase signal 345. As a result, the modulation selection signal 415 changes from a low logical level to a high logical level, causing the multiplexer component 420 to selectively switch to outputting, as the proof-mass drive signal 335, the signal received at its second input; i.e. the inverse 640 of the digital phase signal 345 in the example illustrated in FIGS. 6 and 7. As a consequence, the digital modulation illustrated in FIG. 7 changes into a second, no-drive phase 720 in which the proof-mass drive signal 335 output by the modulation component 300 comprises the inverse 640 of the digital phase signal 345.

The inverse 640 of the digital phase signal 345 comprises a phase shifted −90° relative to the proof-mass motion measurement voltage signal 314. As such, the proof-mass drive signal 335 comprising the inverse 640 of the digital phase signal 345 will have the effect of decelerating the oscillations of the proof-mass, causing an accelerated reduction in the magnitude of the proof-mass oscillations. Accordingly, during such a no-drive phase 720, the amplitude of the proof-mass motion measurement voltage signal 314 will decrease as the magnitude of the proof-mass oscillations decreases, resulting in the proof-mass motion measurement voltage falling below the reference amplitude signal 322. Upon the proof-mass motion measurement voltage signal 314 falling below the reference amplitude signal 322, the gain control component 320 ceases detecting the proof-mass motion measurement voltage signal 314 exceeding the reference amplitude signal 322, and thus ceases outputting high logical level pulses within the digital amplitude modulation control signal 325. As a result, the digital amplitude modulation control signal subsequently comprises a substantially continuous low logical level. Thus, upon the next rising edge of the digital phase signal 345, the flip-flop 410 captures and holds the low logical level of the digital amplitude modulation control signal 325, causing the modulation selection signal 415 to change from a high logical level to a low logical level. As a result, the multiplexer component 420 selectively reverts back to outputting the non-inverted differential form of the digital phase signal 345. As a consequence, the digital modulation illustrated in FIG. 7 reverts back to a drive phase 730 in which the proof-mass drive signal 335 output by the modulation component comprises, in the illustrated example, the non-inverted differential form of the digital phase signal 345.

Figure 8:
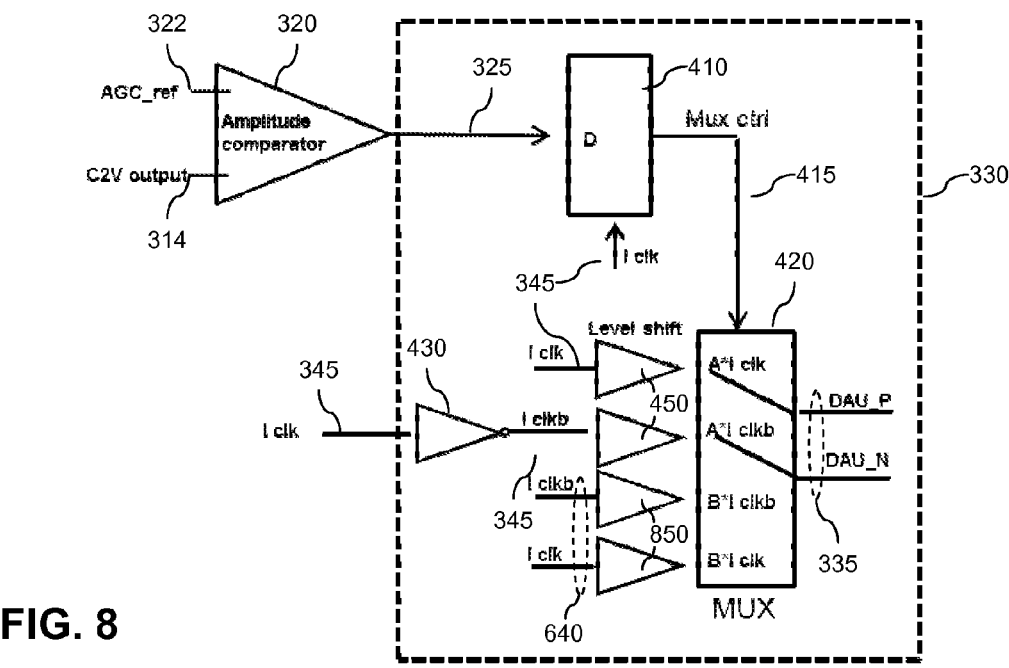
FIG. 8 illustrates a simplified block diagram of a further alternative example of a modulation component of the drive-mode oscillator module of FIG. 3.

As for the example illustrated in FIG. 4, each component of the differential form of the digital phase signal 345 is passed to the first (differential) input of the multiplexer component 420 through a level shifter 450. In the example illustrated in FIG. 6, the inverse 640 of the digital phase signal 345 is provided directly to the second (differential) input of the multiplexer component 420 substantially without any level shifting. However, it is contemplated that level shifting may also be applied to the inverse 640 of the digital phase signal 345. For example, and as illustrated in FIG. 8, each differential component of the inverse 640 of the digital phase signal 345 may be passed to the second (differential) input of the multiplexer component 420 through a level shifter 850, which may be configured to apply the same or a different voltage level shift to that of the level shifters 450.

Referring back to FIG. 3, the digital modulation provided by the drive-mode oscillator module 300 makes use of digital modulated stimuli within a polar architecture that enables a significantly simplified implementation for the control and driving of a proof-mass within a MEMS device, as compared with conventional analogue architectures. Furthermore, the use of digital components in the manner reduces current consumption and die size as compared with conventional analogue architectures.

In the example illustrated in FIG. 3, the digital stimulus needs to be substantially synchronous with the proof-mass displacement in order to be able to amplify its motion (resonance conditions). In order to achieve such synchronization, the drive-mode oscillator module 300 uses the phase detection signal 344 as a reference. However, the phase detection signal 344 is typically only reliably when the differential output of the proof-mass motion measurement voltage signal 314 is above, say, a few mV. Since the amplitude of the proof-mass motion measurement voltage signal 314 is directly proportional to the magnitude of the oscillations of the proof-mass, the drive-mode oscillator module 300 in the illustrated example requires the proof-mass to be oscillating in order to operate.

Accordingly, in the illustrated example, the drive-mode oscillator module 300 further comprises an analogue start-up component 350 selectively arranged to generate a proof-mass drive signal 355 for driving the proof-mass 120 of the MEMS device 100 during a start-up phase. In the illustrated example, the analogue start-up component 350 comprises an integrator component 352 arranged to receive the proof-mass motion measurement signal 314 output by the C2V circuit 310 and apply a 90° phase shift thereto, and an amplifier component 354 arranged to receive the phase shifted proof-mass motion measurement signal, and to output the proof-mass drive signal 355 based at least partly on the phase shifted proof-mass motion measurement signal.

The drive-mode oscillator module 300 further comprises a multiplexer component 360 arranged to receive at a first (differential) input thereof the proof-mass drive signal 335 output by the digital modulator 330, and to receive at a second (differential) input thereof the proof-mass drive signal 355 output by the analogue start-up component 350. The multiplexer component 360 is further arranged to receive a start-up control signal 365, and to selectively output one of the proof-mass drive signals 335, 355 in accordance with the start-up control signal 365. In this manner, during start-up of the MEMS device 100, the drive-mode oscillator module 300 may be configured, via the start-up control signal 365, to output a proof-mass drive signal 355 generated by the analogue start-up module 350. Once the proof-mass 120 comprises oscillations of sufficient magnitude for the phase detection signal 344 to be reliable, the drive-mode oscillator module 300 may then be reconfigured to output a proof-mass drive signal 335 generated by the digital modulator 330. Once the multiplexer component 360 is arranged to receive the signal 335 generated by the digital modulator the start-up circuit is switched off reducing significantly the power consumption.

Significantly, in the illustrated example the analogue start-up component 350 is only required to provide an initial proof-mass drive signal 355 in order to start the proof-mass oscillating. As such, it is not required to perform gain control for the proof-mass drive signal 355 output thereby. Consequently, no complex automatic gain control (AGC) circuitry is required, significantly reducing the additional power consumption and die size required.

Figure 9:
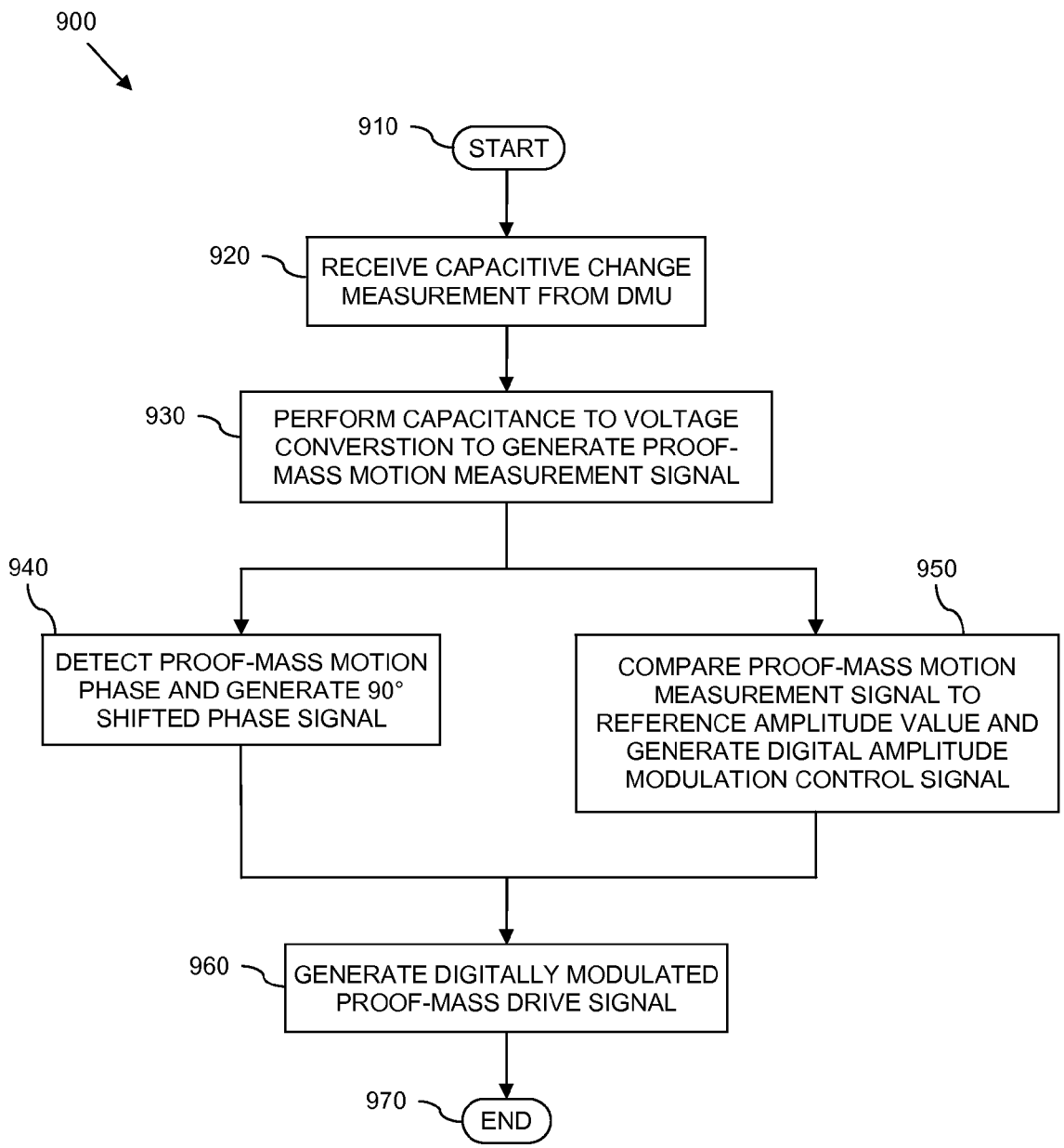
FIG. 9 illustrates a simplified flowchart of an example of a method of generating a proof-mass drive signal for use within a micro-electro-mechanical system (MEMS) device.

Referring now to FIG. 9, there is illustrated a simplified flowchart 900 of an example of a method of generating a proof-mass drive signal for use within a micro-electromechanical system (MEMS) device, such as may be implemented within the drive-mode oscillator module 300. The method starts at 910, and moves on to 920 where a capacitance change measurement signal from a drive measurement unit (DMU) is received, such as the capacitance change measurement signal 312 illustrated in FIG. 3. Next, at 930, the received capacitance change measurement signal is converted into a proof-mass motion measurement voltage signal, such as the proof-mass motion measurement signal 314 illustrated in FIG. 3. A proof-mass motion phase is then detected from the proof-mass motion measurement voltage signal, at 940, and a 90° shifted phase signal is generated. The proof-mass motion measurement voltage signal is also compared to a reference amplitude value and a digital amplitude modulation control signal is generated at 950. A digitally modulated proof-mass drive signal is then generated, at 960, based at least partly on the 90° shifted phase signal and the digital amplitude modulation control signal. The method then ends, at 970.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, all of the components of the drive-mode oscillator module 300 illustrated in FIG. 3 may be implemented within a single integrated circuit device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A drive-mode oscillator module for generating at least one proof-mass drive signal for use within a micro-electromechanical system (MEMS) device, the drive-mode oscillator module comprising:
   at least one gain control component arranged to receive at least one proof-mass motion measurement signal, receive at least one reference amplitude signal, compare the at least one proof-mass motion measurement signal to the at least one reference amplitude signal, generate a digital modulation control signal based at least partly on the at least one proof-mass motion measurement signal, and output the digital modulation control signal comprising an indication of whether the at least one proof-mass motion measurement signal exceeds the at least one reference amplitude signal; and
   at least one modulation component arranged to receive the digital modulation control signal, and to output at least one proof-mass drive signal, wherein the at least one modulation component is arranged to digitally modulate the at least one proof-mass drive signal based at least partly on the received digital modulation control signal.

2. A drive-mode oscillator module for generating at least one proof-mass drive signal for use within a micro-electromechanical system (MEMS) device, the drive-mode oscillator module comprising:
   at least one gain control component arranged to receive at least one proof-mass motion measurement signal, and to generate a digital modulation control signal based at least partly on the at least one proof-mass motion measurement signal;
   at least one modulation component arranged to receive the digital modulation control signal, and to output at least one proof-mass drive signal, wherein the at least one modulation component is arranged to digitally modulate the at least one proof-mass drive signal based at least partly on the received digital modulation control signal; and
   at least one phase component arranged to:
      receive the at least one proof-mass motion measurement signal;
      detect a proof-mass motion phase; and
      output to the at least one modulation component a digital phase signal,
      wherein the at least one modulation component is further arranged to output the at least one proof-mass drive signal comprising a phase based at least partly on the received digital phase signal output by the at least one phase component.

3. The drive-mode oscillator module of claim 2, wherein the at least one phase component is arranged to output the digital phase signal comprising a 90° phase shift relative to the detected proof-mass motion phase.

4. The drive-mode oscillator module of claim 3, wherein the at least one phase component comprises a comparator arranged to:
   receive a differential proof-mass motion measurement signal;
   compare a first differential component of the differential proof-mass motion measurement signal to a second differential component of the differential proof-mass motion measurement signal; and
   output a phase detection signal based at least partly on the comparison of the first and second differential components of the differential proof-mass motion measurement signal, wherein the phase component further comprises a phase shift component arranged to:
   receive the phase detection signal output by the comparator;
   apply a 90° phase shift to the phase detection signal; and
   output the digital phase signal comprising the phase shifted phase detection signal.

5. The drive-mode oscillator module of claim 2, wherein the modulation component comprises at least one level shifter arranged to receive the digital phase signal output by the at least one phase component, apply a voltage level shift to the received digital phase signal, and to output at least one proof-mass drive signal based at least partly on the level shifted digital phase signal.

6. The drive-mode oscillator module of claim 5, wherein the at least one level shifter is configurable to apply a configurable voltage level shift to the received digital phase signal.

7. The drive-mode oscillator module of claim 1, wherein the modulation component is arranged to apply amplitude shift keying (ASK) modulation to the at least one proof-mass drive signal based at least partly on the received digital modulation control signal.

8. The drive-mode oscillator module of claim 7, wherein the modulation component is arranged to:
output a 90° phase shifted oscillating proof-mass drive signal upon the digital modulation control signal comprising an indication that the at least one proof-mass motion measurement signal is less than the at least one reference amplitude signal; and
output a constant voltage proof-mass drive signal upon the digital modulation control signal comprising an indication that the at least one proof-mass motion measurement signal exceeds the at least one reference amplitude signal.

9. The drive-mode oscillator module of claim 1, wherein the modulation component is arranged to apply binary phase shift keying (BPSK) modulation to the at least one proof-mass drive signal based at least partly on the received digital modulation control signal.

10. The drive-mode oscillator module of claim 9, wherein the modulation component is arranged to:
output a 90° phase shifted oscillating proof-mass drive signal upon the digital modulation control signal comprising an indication that the at least one proof-mass motion measurement signal is less than the at least one reference amplitude signal; and
output an inverted form of the 90° phase shifted oscillating proof-mass drive signal upon the digital modulation control signal comprising an indication that the at least one proof-mass motion measurement signal exceeds the at least one reference amplitude signal.

11. The drive-mode oscillator module of claim 1, wherein the drive-mode oscillator module further comprises at least one analogue start-up component selectively arranged to generate a proof-mass drive signal for driving a proof-mass of the MEMS device during a start-up phase of the MEMS device.

12. A drive-mode oscillator module for generating at least one proof-mass drive signal for use within a micro-electro-mechanical system (MEMS) device, the drive-mode oscillator module comprising:

at least one gain control component arranged to receive at least one proof-mass motion measurement signal, and to generate a digital modulation control signal based at least partly on the at least one proof-mass motion measurement signal;
at least one modulation component arranged to receive the digital modulation control signal, and to output at least one proof-mass drive signal, wherein the at least one modulation component is arranged to digitally modulate the at least one proof-mass drive signal based at least partly on the received digital modulation control signal; and
at least one analogue start-up component selectively arranged to generate a proof-mass drive signal for driving a proof-mass of the MEMS device during a start-up phase of the MEMS device, wherein the at least one analogue start-up component comprises:
an integrator component arranged to receive the at least one proof-mass motion measurement signal and apply a 90° phase shift thereto; and
an amplifier component arranged to receive the phase shifted proof-mass motion measurement signal, and to output a proof-mass drive signal based at least partly on the phase shifted proof-mass motion measurement signal.

13. The drive-mode oscillator module of claim 1, wherein the drive-mode oscillator module comprises at least one capacitance to voltage component arranged to receive a signal comprising an indication of a capacitance change of a MEMS drive measurement unit (DMU) and to convert the received indication of a capacitance change to the proof-mass motion measurement signal.

14. The drive-mode oscillator module of claim 1 implemented within an integrated circuit device comprising at least one die within a single integrated circuit package.

15. A micro-electro-mechanical system (MEMS) device comprising at least one drive-mode oscillator module according to claim 1.

* * * * *